(12) United States Patent
Gimbel et al.

(10) Patent No.: US 6,945,706 B2
(45) Date of Patent: Sep. 20, 2005

(54) FERRULE GUIDE MEMBER AND FERRULE WITH PRECISION OPTICAL FIBER PLACEMENT AND METHOD FOR ASSEMBLING SAME

(75) Inventors: Brian J. Gimbel, Horseheads, NY (US); Darrell R. Childers, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 162 days.

(21) Appl. No.: 10/256,550

(22) Filed: Sep. 27, 2002

(65) Prior Publication Data

US 2004/0062490 A1 Apr. 1, 2004

(51) Int. Cl.7 .................................................. G02B 6/36
(52) U.S. Cl. .............................. 385/84; 385/78; 385/80; 385/83
(58) Field of Search ....................... 425/183; 385/50–84, 385/129–132, 147, 49, 92

(56) References Cited

U.S. PATENT DOCUMENTS

| | | | | |
|---|---|---|---|---|
| 5,337,384 A | * | 8/1994 | Basavanhally et al. | 385/54 |
| 5,786,002 A | * | 7/1998 | Dean et al. | 425/183 |
| 5,867,620 A | * | 2/1999 | Bunin et al. | 385/53 |
| 6,213,750 B1 | | 4/2001 | Dean et al. | 425/183 |
| 6,309,488 B1 | * | 10/2001 | Yang et al. | 156/73.1 |
| 6,676,302 B2 | * | 1/2004 | Cheng et al. | 385/88 |

FOREIGN PATENT DOCUMENTS

WO      WO 97/34176      9/1997      ............ G02B/6/38

* cited by examiner

Primary Examiner—John R. Lee
Assistant Examiner—David A. Vanore

(57) ABSTRACT

A ferrule and a fiber guide member are provided for accurately positioning optical fibers at the front face of a ferrule. The fiber guide member can be used as a removable or permanent template to align the optical fibers in the ferrule. The fiber guide member may also be polished to provide a finished end face, or even removed in a polishing process. A method is also provided for accurately positioning the optical fibers in a ferrule.

23 Claims, 4 Drawing Sheets

FERRULE GUIDE MEMBER AND FERRULE WITH PRECISION OPTICAL FIBER PLACEMENT AND METHOD FOR ASSEMBLING SAME

The present inventions relate to a ferrule with precision optical fiber placement, and more particularly, a ferrule and a fiber guide member, the fiber guide member accurately positioning optical fibers at the front face of a ferrule, and a method for assembling the same.

BACKGROUND OF THE INVENTIONS

Ferrules attached to the ends of optical fibers are used to make connections between the optical fibers. The optical signals transmitted in the optical fibers must be able to pass through such connections with minimal signal loss. In order for the signal loss to be minimal, the optical fibers, and hence the ferrules, need to be precisely aligned with one another. The issue of precisely aligning opposing optical fibers is even more sensitive with multi-fiber ferrules because of the need to precisely align all the optical fibers relative to each other and relative to guide pin bores within the molded ferrule. However, it is difficult to maintain the precision of the placement of the optical fibers relative to the guide pin holes, especially when the front face of the ferrules are polished, which removes a portion of the ferrule. If the fiber holes are larger than the optical fiber, and the optical fiber is able to vary in its positioning in the fiber hole, then removing a portion of the ferrule by polishing tends to "move" the optical fiber within the fiber hole. It may also be difficult to hold the position of each fiber hole relative to the guide pin holes, so the fiber holes may also "move" within the ferrule.

U.S. Pat. No. 6,213,750, assigned to the same assignee as the present invention, provides one method and apparatus for trying to precisely mold the fiber holes such that the optical fibers do not "move" in the fiber holes when the ferrule is polished. However, such a technique can be relatively expensive. Moreover, the fiber holes must be somewhat larger than the optical fibers to allow for variations in the optical fiber's diameter and to allow the optical fibers to be easily inserted into the fiber holes. Thus, the optical fibers may possibly "move" within the fiber holes.

Accordingly, the present inventions are directed to a fiber guide member and a ferrule that substantially obviates one or more of the potential problems and disadvantages in the prior art. Additional features and advantages of the inventions will be set forth in the description that follows, and in part will be apparent from the description, or may be learned by practice of the invention. The objectives and other advantages of the inventions will be realized and attained by the apparatus and process particularly pointed out in the written description and claims, as well as the appended drawings.

SUMMARY OF THE INVENTIONS

To achieve these and other advantages and in accordance with the purpose of the inventions as embodied and broadly described herein, a ferrule having precision optical fiber positioning is provided that includes a ferrule body, the ferrule body having a front face and a rear face, and a plurality of bores extending therebetween, a fiber guide member, the fiber guide member having at least a corresponding number of bores therein and being adjacent the front face of the ferrule to precisely position an optical fiber in at least one of the plurality of bores at the front face of the ferrule.

In another aspect, the inventions provide for a method of securing fibers in a known relationship at a front face of a ferrule that includes providing a multifiber ferrule, the multifiber ferrule having a front face and a rear face, with a plurality of fiber bores extending therebetween, providing a fiber guide member, the fiber guide member having a plurality of fiber guide bores therein, the plurality of fiber guide bores having a predetermined relationship to one another and the plurality of ferrule fiber bores, maintaining the fiber guide member relative to the ferrule, inserting optical fibers through respective ferrule fiber bores and fiber guide bores, and securing the optical fibers in the ferrule while the optical fibers protrude through the fiber guide member, and polishing the ferrule to provide a polished end face.

In another aspect of the inventions, a ferrule having a polished end face and precisely placed optical fibers is provided that includes a ferrule, the ferrule having a front face and a rear face, and a plurality of fiber bores extending therebetween, a plurality of optical fibers secured in the fiber bores in the ferrule in a predetermined relationship with one another, and a fiber guide member, the fiber guide member having at least a corresponding number of bores therein. The fiber guide member is configured to be disposed adjacent the front face of the ferrule to precisely position optical fibers in the plurality of bores in a predetermined relationship at an end face of the ferrule In another aspect of the inventions, a removable optical fiber guide member for precisely aligning optical fibers in a multifiber ferrule is provided that includes a body configured to align with a front face of a multifiber ferrule, a first plurality of holes in the body for receiving optical fibers, and a second plurality of holes in the body for receiving guide pins. The first plurality of holes has a predetermined relationship to the second plurality of holes and the first plurality of holes has a predetermined relationship to optical fiber holes in the multifiber ferrule at a predetermined temperature.

It is to be understood that the foregoing general description and the following detailed description are exemplary and explanatory and are intended to provide further explanation of the inventions as claimed.

The accompanying drawings are included to provide a further understanding of the inventions and are incorporated in and constitute a part of the specification. The drawings illustrate several embodiments of the inventions and together with the description serve to explain the principles of the invention.

DETAILED DESCRIPTION OF THE INVENTIONS

Figure 1:
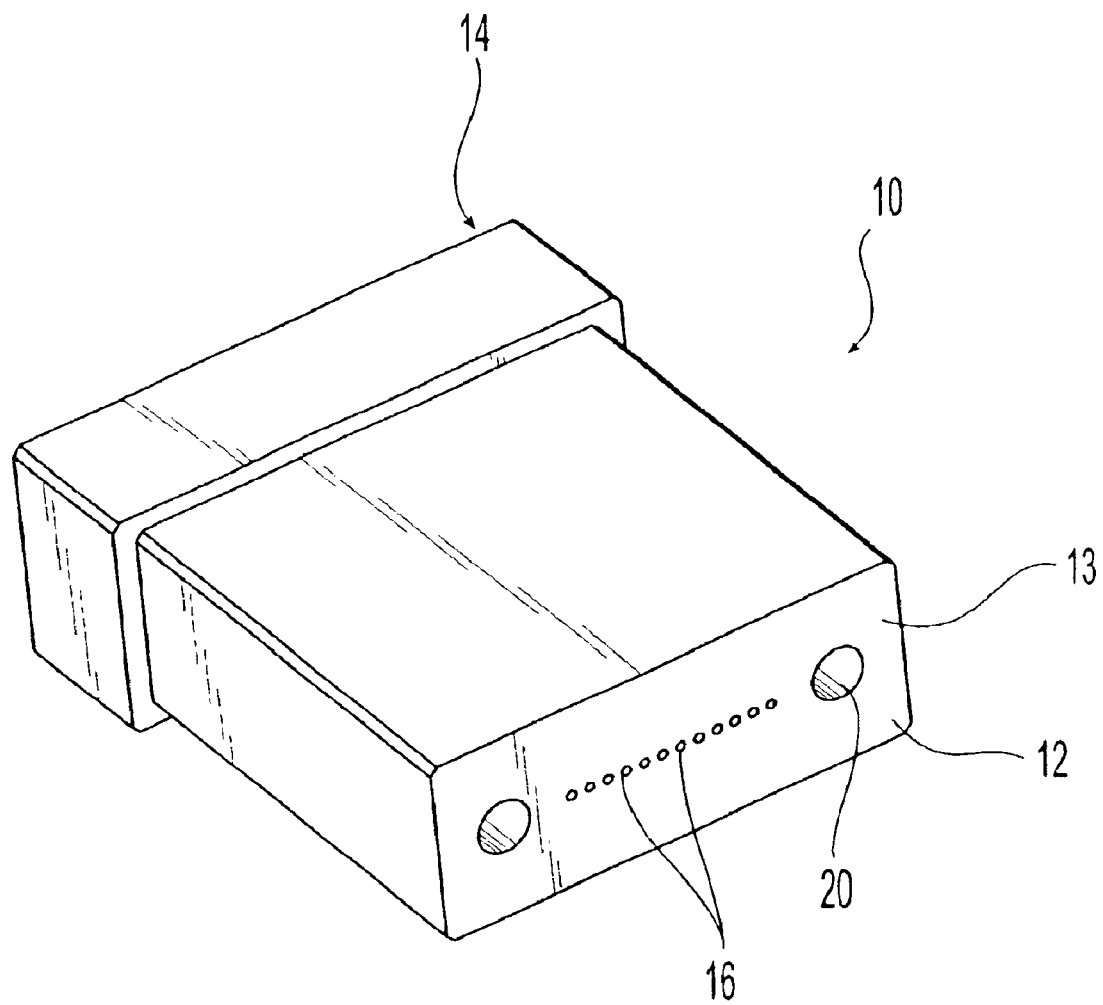
FIG. 1 is a perspective view of a ferrule that can be used in one embodiment of the present inventions.
Figure 3:
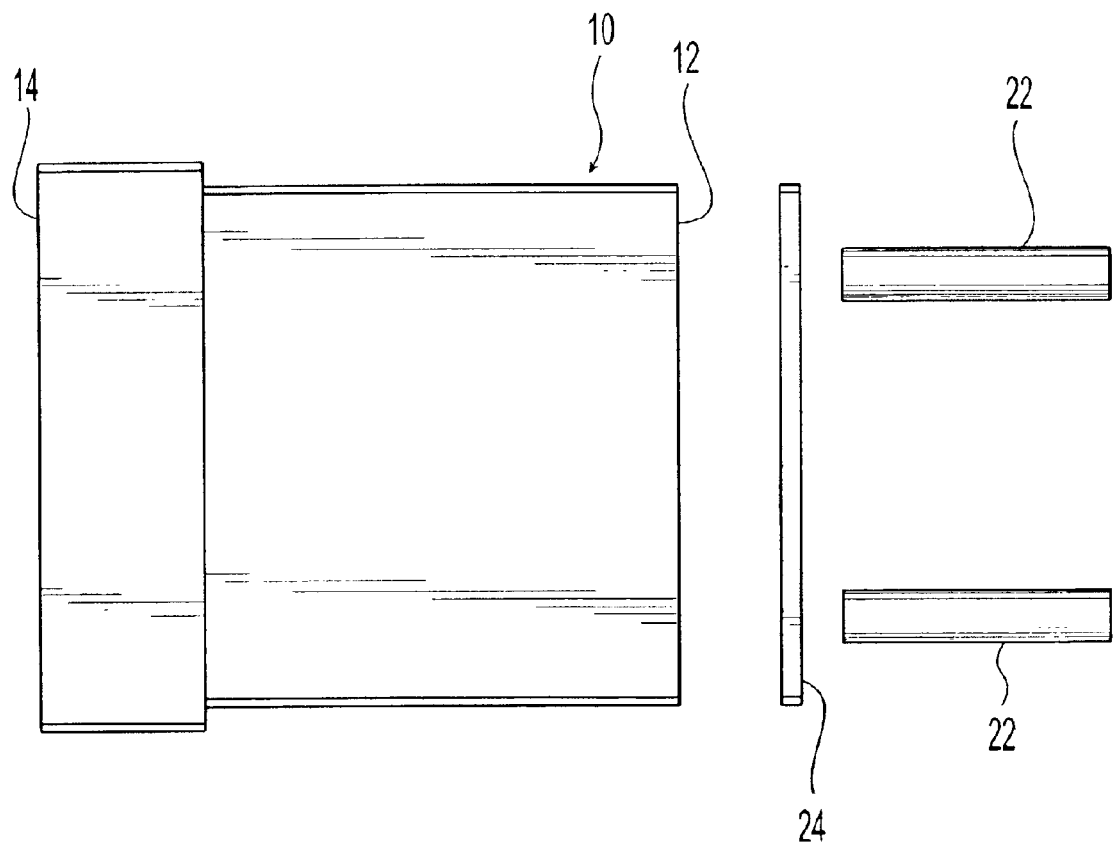
FIG. 3 is an exploded top view of the ferrule, fiber guide member, and guide pins according to an embodiment of the present inventions.

A ferrule 10 is illustrated in FIG. 1 that has a front face 12 and a rear face 14. The ferrule 10 has micro or fiber holes 16 extending between the front face 12 and the rear face 14 in which optical fibers 18 are secured. The ferrule 10 also has guide pin holes 20 to retain guide pins 22. See FIG. 3. As is known in the art, the guide pins 22 are used to accurately position the front faces of the ferrules, and hence the optical fibers secured therein with respect to one another. The diameter of the fiber holes 16 is typically within 1.0 μm of the nominal size of an optical fiber, to allow for manufacturing tolerances of the optical fibers and to allow the optical fibers to be easily inserted into the ferrule. The guide pin holes 20 generally have a similar allowance as the guide pins are used as the reference points for all other features in the ferrule, including the positioning of each of the fiber holes.

It should be noted that while an MT ferrule is illustrated in the figures, any multifiber ferrule can be used. Acceptable ferrules include MTRJ or any multifiber ferrule that uses guide pins to align the ferrule with any other complementary optical equipment (transceivers, lenses, other ferrules, etc.)

Figure 2:
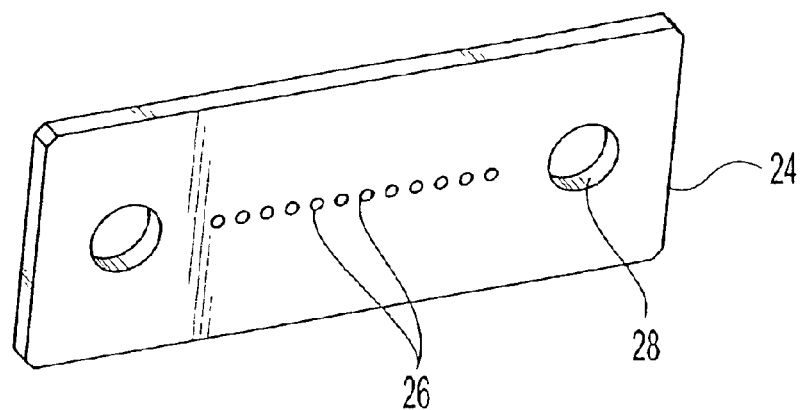
FIG. 2 is a perspective view of a fiber guide member according to an embodiment of the present inventions.

In order to assist in aligning the optical fibers 18 in the fiber holes 16, a fiber guide member 24 is provided to accurately position the optical fibers 18 relative to the guide pins 22. See FIG. 2. Since the guide pins 22 are used to align the ferrule with a complementary structure as noted above, the optical fibers 18 need to be positioned accurately with respect to the guide pins 22. The fiber guide member 24 is preferably a thin wafer formed by etching. Such a wafer could, for example, be made of silicon or any other material suitable for manufacture by plasma etching techniques. Using such a process, the fiber holes 26 and guide pin holes 28 can be manufactured to within about 0.1 microns to the desired placement of the holes. Other manufacturing techniques that preferably allow for a similar degree of accuracy could also be used. For example, the fiber guide member 24 can also be made from copper or a nickel alloy by an electroforming process. It is also possible to use a thermoplastic or thermoset material.

Figure 5:
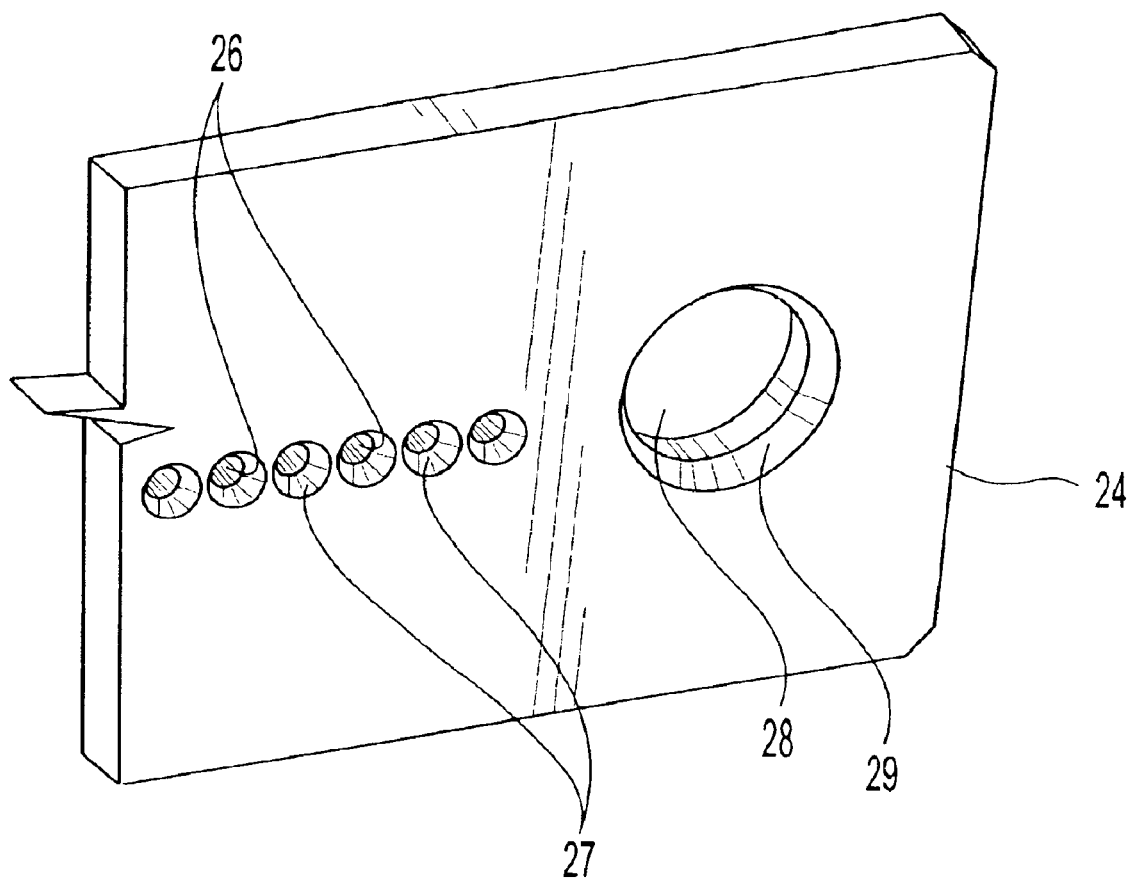
FIG. 5 is a perspective view of a part of a fiber guide member according to an alternative embodiment of the present inventions.

As shown in the alternative embodiment in FIG. 5, only a portion of which is shown so that the details may be seen, the holes 26 may also have a enlarged lead-in portion 27, to assist in guiding the optical fibers 18 into the holes 26. Similarly, the guide pin holes 28 may also have a lead-in portion 29 to allow easier access to the guide pin holes. While the lead-in portions 27,29 are shown on only one side, they may be on both sides, provided the fiber guide member 24 is of a sufficient thickness. The lead-in portions 29 may also be on a different side from the lead-in portions 27, particularly if the guide pins 22 are inserted after the optical fibers 18 are inserted through the holes 26, since the guide pins would then be inserted from front.

Figure 4:
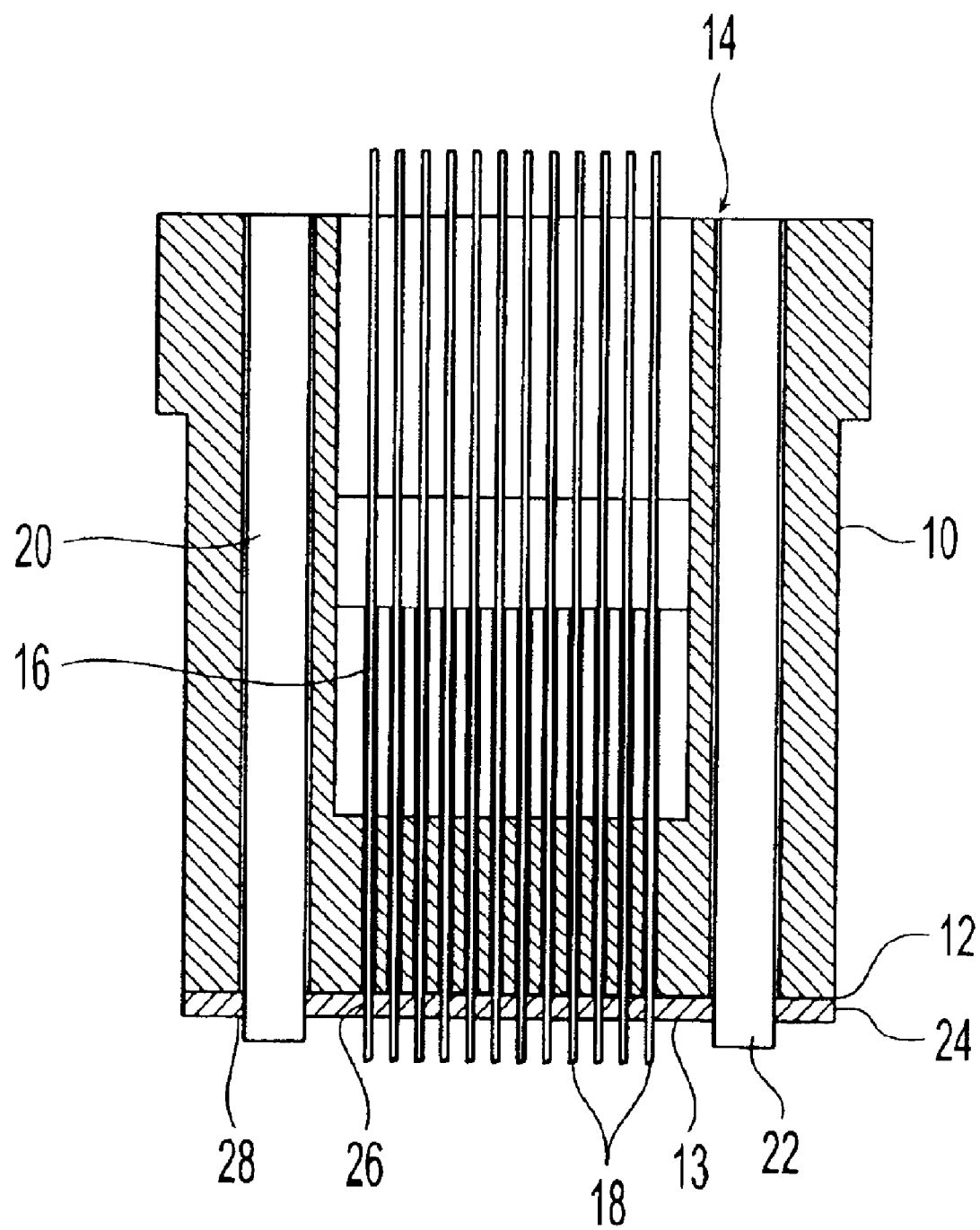
FIG. 4 is a cross sectional view of a ferrule and fiber guide member according to an embodiment of the present inventions.

The fiber guide member 24 has a plurality of holes 26 that correspond to the plurality of optical fiber holes 16 in the ferrule to be used. Therefore, while twelve fiber holes are shown in the ferrule 10 and fiber guide member 24 in FIGS. 1 and 4, any number of optical fiber holes 16 in the ferrule 10 and fiber guide member 24 are within the scope of the present inventions. Guide pins 22 are used to align the guide pin holes in the fiber guide member 24 and the guide pin holes 20 in the ferrule.

The method of using the fiber guide member 24 and ferrule 10 will now be described. The guide pins 22 are preferably inserted into the guide pin holes 24 of ferrule 10, with a small portion of the guide pins 22 extending beyond the front face of the ferrule. The fiber guide member 24 is then preferably placed on the guide pins 22 and pushed next to the front face 12 of the ferrule 10. The optical fibers 18 are then inserted into the ferrule 10 through the rear face 14 and into the fiber holes 16. The optical fibers 18 need extend through the front face 12 of the ferrule 10 and the fiber guide member 24 such that they do not retract during the hardening or curing of the adhesive that secures the fibers 18 into the ferrule 10. It should be noted that the order of inserting the fibers 18, inserting the guide pins 22, and placing the fiber guide member 24 at the face of the ferrule 10 can be done in any order. For example, the optical fibers 18 could be first inserted into and through the ferrule 10 before the fiber guide member 24 is placed on the guide pins 22. Similarly, the guide pins 22 could be inserted last.

Epoxy or other suitable adhesive is injected or otherwise inserted into the ferrule 10 and the adhesive is cured or hardened. Preferably a heat-cured epoxy is used with the ferrules and the ferrules are then cured between 70 and 150° C., but most preferably at 100° C., in a oven for an appropriate time, depending on the manufacturer and epoxy, but usually about 30 minutes. However, any suitable adhesive could be used to secure the optical fibers 18 in the fiber holes 16, including, for example, UV-curable epoxy, anaerobic epoxy, or even cyanoacrylate.

The ferrules 10 are known to expand slightly during the curing cycle and the material that is used for the fiber guide member 24 must either also expand as do the ferrules or the fiber guide member 24 must have the holes 26 spaced so they line up with holes 16 in the ferrules when the ferrules reach the curing temperature. Otherwise, the optical fibers 18 will not be accurately placed in the fiber holes 16 upon curing. It is also possible for the fiber guide member 24 to be made from a material that has the same coefficient of thermal expansion as the ferrule 10. If the fiber guide member 24 is made from such a material, then no allowances for the expansion of the ferrule 10 during curing are needed.

Depending on the length of the optical fibers protruding through the ferrule, the optical fibers 18 may first have to be cut, scribed, or otherwise shortened prior to the ferrule being polished to provide a polished, finished end face, which is described in more detail below. Similarly, the guide pins 22 preferably only slightly protrude through the fiber guide member 24, rather than in the typical configuration during use when the guide pins extend beyond the end of the ferrule by 3 mm. Similarly, the guide pins 22 may not protrude beyond the end of the fiber guide member 24 at all, but only extend beyond the face of the ferrule 10 a sufficient distance to hold the fiber guide member 24 to remain adjacent the ferrule 10.

The guide pins 22 can be removed before the polishing of the ferrule 10 (or the fiber guide member 24 if to be left on), or they could be polished and then removed after the polishing is completed. The guide pins 22 could then be removed from the ferrule and reused for the next ferrule or be thrown away.

If a mold release agent is applied to the fiber guide member 24, then the fiber guide member 24 should slide easily off of the optical fibers 18 and guide pins 22 as the epoxy will not bond with them. The guide pins 22 can then be removed and the ferrule polished. If, however, the fiber guide member 24 is attached to the ferrule, whether intentionally or unintentionally, the fiber guide member 24 can be polished to become the front face 13 of the ferrule, or it can be polished off entirely. Since the fiber guide member 24 is made of silicon or other soft material, the polishing process to remove the fiber guide member 24 should not require too many consumables. When polishing off the fiber guide member 24, the polishing process should remove as little of the ferrule 10 as possible to ensure that the optical fibers 18 are correctly positioned. If polishing the fiber guide member 24 to be the end face 13, then a standard polishing process could be used. In all cases, the surface through which the optical fibers 18 protrude should be polished to allow for proper alignment and engagement of the optical fibers 18 with optical fibers in the other fiber optic equipment.

As used herein, the front face 12 of the ferrule is the physical face of the ferrule as the ferrule is manufactured. The end face 13 of the ferrule is the polished, finished face of the ferrule that is ready to be mated. The front face 12 may then be the same as the end face 13, if the front face is polished. As noted above, however, the end face 13 may also be a polished surface of the fiber guide member 24.

It will be apparent to those skilled in the art that various modifications and variations can be made in the present inventions without departing from the spirit or scope of the invention. Thus, it is intended that the present invention cover the modifications and variations of the inventions provided they come within the scope of the appended claims and their equivalents.

We claim:

1. A ferrule having precision optical fiber positioning comprising:
    a ferrule body, the ferrule body having a front face and a rear face, and a plurality of bores extending therebetween; and
    a fiber guide member in the form of a thin wafer attached to the ferrule body, the fiber guide member having at least a corresponding number of bores therein, the fiber guide member being configured to be disposed adjacent the front face of the ferrule to precisely position optical fibers in the plurality of bores at the front face of the ferrule.

2. The ferrule of claim 1, wherein the fiber guide member is made of one of the materials in the group consisting of copper, nickel alloy, and silicon.

3. The ferrule of claim 1, wherein at least two of the plurality of bores in the ferrule and at least two of the bores in the fiber guide member are guide pin bores to receive guide pins to hold the fiber guide member adjacent the front face of the ferrule.

4. A ferrule having precision optical fiber positioning comprising:
    a ferrule body, the ferrule body having a front face and a rear face, and a plurality of bores extending therebetween; and
    a fiber guide member, the fiber guide member having at least a corresponding number of bores therein, the fiber guide member being configured to be disposed adjacent the front face of the ferrule to precisely position optical fibers in the plurality of bores at the front face of the ferrule;
    wherein the fiber guide member bores have a dimension that is within about 0.1 µm of a predetermined size.

5. The ferrule of claim 4, wherein the predetermined size corresponds to a diameter of an optical fiber to be inserted into at least one of the ferrule bores.

6. The ferrule of claim 1, wherein the bores in the ferrule are aligned with the bores in the fiber guide member.

7. A ferrule having precision optical fiber positioning comprising:
    a ferrule body, the ferrule body having a front face and a rear face, and a plurality of bores extending therebetween; and
    a fiber guide member, the fiber guide member having at least a corresponding number of bores therein, the fiber guide member being configured to be disposed adjacent the front face of the ferrule to precisely position optical fibers in the plurality of bores at the front face of the ferrule;
    wherein the bores in the ferrule and the bores in the fiber guide member are aligned at a predetermined temperature of about 100° C.

8. The ferrule of claim 7, wherein optical fibers are secured in the ferrule using a heat-curable epoxy, and the predetermined temperature is a temperature at which the epoxy cures.

9. The ferrule of claim 8, wherein the fiber guide member is removed after the fibers are secured within the ferrule.

10. The ferrule of claim 8, wherein the fiber guide member is polished off after optical fibers are secured within the ferrule.

11. The ferrule of claim 8, wherein the fiber guide member is polished to be a polished end face of the ferrule.

12. A ferrule having precision optical fiber positioning comprising:
    a ferrule body, the ferrule body having a front face and a rear face, and a plurality of bores extending therebetween; and
    a fiber guide member having at least a corresponding number of bores therein, the fiber guide member being configured to be disposed adjacent the front face of the ferrule to precisely position optical fibers in the plurality of bores at the front face of the ferrule, the fiber guide member having a coefficient of thermal expansion that is matched to a coefficient of thermal expansion of the ferrule.

13. A ferrule having precision optical fiber positioning comprising:
    a ferrule body, the ferrule body having a front face and a rear face, and a plurality of bores extending therebetween; and
    a fiber guide member, the fiber guide member having at least a corresponding number of bores therein, the fiber guide member being configured to be disposed adjacent the front face of the ferrule to precisely position optical fibers in the plurality of bores at the front face of the ferrule;
    wherein at least one of the bores in the fiber guide member has an enlarged lead-in portion.

14. A method of securing fibers in a known relationship at a front face of a polished ferrule comprising the steps of:
    providing a multifiber ferrule, the multifiber ferrule having a front face and a rear face, with a plurality of fiber bores extending therebetween;
    providing a fiber guide member, the fiber guide member having a plurality of fiber guide bores therein, the plurality of fiber guide bores having a predetermined relationship to one another and the plurality of ferrule fiber bores;
    maintaining the fiber guide member relative to the ferrule;
    inserting optical fibers through respective ferrule fiber bores and fiber guide bores;
    securing the optical fibers in the ferrule while the optical fibers protrude through the fiber guide member;
    removing the fiber guide member; and
    polishing the ferrule to provide a polished end face.

15. The method of claim 14, wherein two of the plurality of bores are guide pin bores, and the step of maintaining the fiber guide member relative to the ferrule further comprises the steps of:

inserting guide pins into the guide pin bores; and disposing the fiber guide member on the guide pins adjacent to the front face of the ferrule.

16. The method of claim 14, further comprising the step of polishing the front face of the ferrule to remove the fiber guide member.

17. The method of claim 14, further comprising the step of polishing the front face of the ferrule with the fiber guide member attached thereto to provide a polished end face.

18. A method of securing fibers in a known relationship at a front face of a polished ferrule comprising the steps of:

providing a multifiber ferrule, the multifiber ferrule having a front face and a rear face, with a plurality of fiber bores extending therebetween;

providing a fiber guide member, the fiber guide member having a plurality of fiber guide bores therein, the plurality of fiber guide bores having a predetermined relationship to one another and the plurality of ferrule fiber bores;

maintaining the fiber guide member relative to the ferrule;

inserting optical fibers through respective ferrule fiber bores and fiber guide bores;

securing the optical fibers in the ferrule while the optical fibers protrude through the fiber guide member; and polishing the ferrule to provide a polished end face;

wherein the step of securing the optical fibers includes the further steps of:

disposing epoxy into the ferrule; and curing the epoxy at a predetermined temperature.

19. A ferrule having a polished end face and precisely placed optical fibers comprising:

a ferrule, the ferrule having a front face and a rear face, and a plurality of fiber bores extending therebetween;

a plurality of optical fibers secured in the fiber bores in the ferrule in a predetermined relationship with one another; and a fiber guide member, the fiber guide member having at least a corresponding number of bores therein, the fiber guide member being configured to be disposed adjacent the front face of the ferrule to precisely position optical fibers in the plurality of bores in a predetermined relationship at an end face of the ferrule;

wherein the fiber guide member is separated from the ferrule prior to polishing and the front face of the ferrule is the end face.

20. A ferrule having a polished end face and precisely placed optical fibers comprising:

a ferrule, the ferrule having a front face and a rear face, and a plurality of fiber bores extending therebetween;

a plurality of optical fibers secured in the fiber bores in the ferrule in a predetermined relationship with one another; and a fiber guide member, the fiber guide member having at least a corresponding number of bores therein, the fiber guide member being configured to be disposed adjacent the front face of the ferrule to precisely position optical fibers in the plurality of bores in a predetermined relationship at an end face of the ferrule;

wherein the fiber guide member is polished away from the ferrule and the front face of the ferrule is the end face.

21. A removable optical fiber guide member for precisely aligning optical fibers in a multifiber ferrule comprising:

a body configured to align with a front face of a multifiber ferrule;

a first plurality of holes in the body for receiving optical fibers; and a second plurality of holes in the body for receiving guide pins;

wherein the first plurality of holes has a predetermined relationship to the second plurality of holes and the first plurality of holes has a predetermined relationship to optical fiber holes in the multifiber ferrule; and wherein the fiber guide member is attached to the ferrule and subsequently removed by polishing.

22. A removable optical fiber guide member for precisely aligning optical fibers in a multifiber fiber comprising:

a body configured to align with a front face of a multifiber ferrule;

a first plurality of holes in the body for receiving optical fibers; and a second plurality of holes in the body for receiving guide pins;

wherein the first plurality of holes has a predetermined relationship to the second plurality of holes and the first plurality of holes has a predetermined relationship to optical fiber holes in the multifiber ferrule at a predetermined temperature of between about 70 and 150° C.

23. A ferrule having precision optical fiber positioning comprising:

a ferrule body, the ferrule body having a front face and a rear face, and a plurality of bores extending therebetween; and a fiber guide member, the fiber guide member having at least a corresponding number of bores therein, the fiber guide member being configured to be disposed adjacent the front face of the ferrule to precisely position optical fibers in the plurality of bores at the front face of the ferrule;

wherein the fiber guide member is polished off after optical fibers are positioned within the ferrule.

* * * * *